United States Patent
Okamoto et al.

(10) Patent No.: US 9,460,853 B2
(45) Date of Patent: *Oct. 4, 2016

(54) MONOLITHIC CERAMIC ELECTRONIC COMPONENT

(71) Applicant: Murata Manufacturing Co., Ltd., Nagaokakyo-shi, Kyoto-fu (JP)

(72) Inventors: Yoshiji Okamoto, Nagaokakyo (JP); Toshihiro Nakai, Nagaokakyo (JP); Shingo Okuyama, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,118

(22) Filed: Dec. 28, 2015

(65) Prior Publication Data

US 2016/0111212 A1    Apr. 21, 2016

Related U.S. Application Data

(63) Continuation of application No. 13/865,235, filed on Apr. 18, 2013, now Pat. No. 9,251,958.

(30) Foreign Application Priority Data

Apr. 19, 2012   (JP) .................................. 2012-095267

(51) Int. Cl.
*H01G 4/30* (2006.01)
*H01G 4/228* (2006.01)
(Continued)

(52) U.S. Cl.
CPC ............ *H01G 4/2325* (2013.01); *H01G 4/232* (2013.01); *H01G 4/30* (2013.01); *H01G 2/065* (2013.01)

(58) Field of Classification Search
CPC ............................ H01G 4/2325; H01G 4/232
USPC ........................................................ 361/306.3
See application file for complete search history.

(56) References Cited

U.S. PATENT DOCUMENTS

| | | | | |
|---|---|---|---|---|
| 4,633,992 A | * | 1/1987 | Ishida | B60K 23/02 192/110 R |
| 7,545,624 B2 | * | 6/2009 | Lee | H01G 4/232 361/303 |

(Continued)

FOREIGN PATENT DOCUMENTS

| | | | |
|---|---|---|---|
| JP | 06084687 A | * | 3/1994 |
| JP | 07037753 A | * | 2/1995 |

(Continued)

OTHER PUBLICATIONS

Okamoto et al., "Monolithic Ceramic Electronic Component", U.S. Appl. No. 13/865,235, filed Apr. 18, 2013.

*Primary Examiner* — Eric Thomas
(74) *Attorney, Agent, or Firm* — Keating & Bennett, LLP

(57) ABSTRACT

When a monolithic ceramic electronic component is viewed from either one of end surfaces thereof, an outer electrode includes a solder-repellent portion and a solder-receivable portion. The solder-repellent portion covers the central portion of an end surface of a ceramic laminate body. The solder-receivable portion includes portions disposed on two opposing sides of the solder-repellent portion. When the monolithic ceramic electronic component is mounted on the circuit board, solder does not adhere to a portion around the central portion of the end surface. Thus, expansion and contraction that occur as a result of application of an AC voltage are not significantly transmitted to the circuit board. Consequently, vibrations of the circuit board are reduced.

8 Claims, 17 Drawing Sheets

(51) Int. Cl.
*H01G 4/232* (2006.01)
*H01G 2/06* (2006.01)

(56) References Cited

U.S. PATENT DOCUMENTS

| | | | |
|---|---|---|---|
| 9,251,958 B2* | 2/2016 | Okamoto | H01G 4/30 |
| 2008/0180877 A1* | 7/2008 | Togashi | H01G 4/30 361/301.4 |

FOREIGN PATENT DOCUMENTS

| JP | 08236387 A | * | 9/1996 |
|---|---|---|---|
| JP | 08330174 A | * | 12/1996 |
| JP | 2002025850 A | * | 1/2002 |
| JP | 2008187036 A | * | 8/2008 |
| JP | 2010186884 A | * | 8/2010 |
| JP | 2012054411 A | * | 3/2012 |

* cited by examiner

MONOLITHIC CERAMIC ELECTRONIC COMPONENT

BACKGROUND OF THE INVENTION

1. Field of the Invention

The present invention relates to monolithic ceramic electronic components, and particularly to a monolithic ceramic capacitor manufactured by a method of reducing acoustic noise generated when an electric field is applied to the monolithic ceramic capacitor mounted on a circuit board.

2. Description of the Related Art

As electronic devices produce increasingly less noise, acoustic noise has become more noticeable, caused by vibrations of monolithic ceramic capacitors (referred to as "monolithic capacitors", below) in power circuits or other components of various devices, such as laptop computers, mobile phones, or digital cameras.

Japanese Unexamined Patent Application Publication No. 2010-186884 describes that acoustic noise occurs when an AC voltage is applied to a monolithic capacitor mounted on a circuit board due to electrostrictive vibrations of the monolithic capacitor propagating through the circuit board.

FIG. 16 and FIG. 17 are drawings illustrated on an online web page "Examples of Noise Countermeasures" of Murata Manufacturing Co., Ltd., searched on Mar. 1, 2012, through Internet URL "http://www.murata.co.jp/products/capacitor/solution/naki.html". When an AC voltage is applied to a monolithic capacitor 110, the monolithic capacitor 110 expands and contracts in directions indicated by the bold arrows, as illustrated in FIG. 16, due to the electrostrictive effect of the ferroelectric ceramic of the monolithic capacitor 110. In FIG. 16, the WT cross section denotes a cross section defined by the width and the thickness of the monolithic capacitor 110. The LT cross section denotes a cross section defined by the length and the thickness of the monolithic capacitor 110. The LW cross section denotes a cross section defined by the length and the width of the monolithic capacitor 110. The broken lines indicate the extent to which the monolithic capacitor 110 expands and contracts when viewed in these cross sections.

As illustrated in FIG. 17, when an AC voltage is applied to the monolithic capacitor 110 that is mounted on the circuit board 101 via a solder 102, the monolithic capacitor 110 expands and contracts. This expansion and contraction of the monolithic capacitor 110 leads to deformation of the circuit board 101 via the solder 102. Thus, the circuit board 101 vibrates in directions such that the surface of the circuit board 101 rises and falls. When the cycle of vibrations of the circuit board 101 falls within a frequency range (20 Hz to 20 kHz) that is audible to human beings, human ears perceive the vibrations as acoustic noise.

These are problems not only for the monolithic capacitor 110 including two outer electrodes 114 but also for a three-terminal monolithic capacitor including three outer electrodes 114. Further, these problems can occur not only in the monolithic capacitor 110, but also in any monolithic ceramic electronic component including a monolithic LC filter.

SUMMARY OF THE INVENTION

Preferred embodiments of the present invention provide a monolithic ceramic electronic component that overcomes the problems described above.

A monolithic ceramic electronic component according to a preferred embodiment of the present invention is a monolithic ceramic electronic component that includes a ceramic laminate body having a cuboid or substantially cuboid shape and including dielectric ceramic layers made of a ferroelectric material and internal electrodes alternately stacked on top of one another in a vertical direction, the ceramic laminate body including an outer periphery defined by an upper surface, a lower surface, two side surfaces, and two end surfaces that are perpendicular or substantially perpendicular to the upper surface, the lower surface, and the two side surfaces; and an outer electrode arranged over one of the two end surfaces and portions of the upper surface, the lower surface, and the two side surfaces that are continuous with the one of the two end surfaces so as to be electrically connected to the internal electrodes. The outer electrode includes a solder-repellent portion to which molten solder does not adhere and a solder-receivable portion to which the molten solder does adhere. The solder-repellent portion is defined by a strip shaped solder-resistant film attached to portions of the outer electrode arranged over the one of the two end surfaces and the two side surfaces of the outer electrode. The solder-receivable portion includes portions disposed on two opposing sides of the solder-repellent portion in the vertical direction so as to sandwich the solder-repellent portion.

The solder-repellent portion may preferably be provided on a portion of some of the dielectric ceramic layers on at least one of the two side surfaces of the ceramic laminate body.

When the monolithic ceramic electronic component is viewed from the one of the two end surfaces over which the outer electrode is arranged, the outer electrode may preferably have a quadrangular or substantially quadrangular shape, and the solder-receivable portion may preferably be arranged so as to extend over four corner portions of the outer electrode.

When the monolithic ceramic electronic component is viewed from the one of the two end surfaces over which the outer electrode is arranged, the solder-receivable portion may preferably be configured such that upper and lower portions of the solder-receivable portion in the vertical direction are symmetrical with each other.

When the monolithic ceramic electronic component is viewed from the one of the two side surfaces over which the outer electrode is arranged, the solder-repellent portion may preferably be arranged so as to extend partially over a portion of the outer electrode provided on the side surface.

The solder-receivable portion may preferably be provided in a portion of the outer electrode that is exposed to the outside.

The outer electrode may preferably include three layers of copper, nickel, and tin, or copper nickel, and gold.

The dielectric ceramic layers may preferably be made of barium titanate.

In the monolithic ceramic electronic component according to various preferred embodiments of the present invention, the solder-repellent portion is arranged so as to cover the central portion of the end surface of the ceramic laminate body. Thus, molten solder is prevented from adhering to the central portion of the end surface. Consequently, acoustic noise generated when an AC voltage is applied to the monolithic ceramic electronic component mounted on the circuit board is reduced. Further, since the solder-receivable portion includes portions disposed on two opposed sides of the solder-repellent portion, the monolithic ceramic electronic component can be mounted on the circuit board regardless of whether its upper surface faces upward or downward. In addition, the monolithic ceramic electronic component can be securely connected to the circuit board after being mounted on the circuit board.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
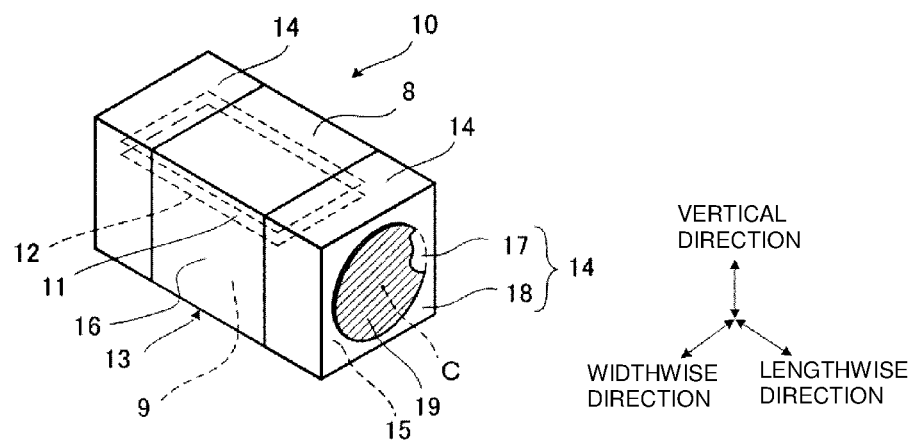
FIG. 1 illustrates a monolithic ceramic capacitor according to a first preferred embodiment of the present invention.

As illustrated in FIG. 1, a monolithic ceramic capacitor 10 includes a ceramic laminate body 13 including a plurality of alternating layers of dielectric ceramic layers 11 and internal electrodes 12, and a pair of outer electrodes 14 provided on both end portions of the ceramic laminate body 13. The outer periphery of the ceramic laminate body 13 is defined by an upper surface 8, a lower surface 9, two side surfaces 16, and two end surfaces 15 perpendicular or substantially perpendicular to the upper surface 8, the lower surface 9, and the two side surfaces 16. The internal electrodes 12 are arranged such that each pair of adjacent electrodes 12 face each other with one dielectric ceramic layer 11 interposed therebetween. One of the pair of opposing internal electrodes 12 is connected to the corresponding one of the outer electrodes 14, and the other one of the pair opposing internal electrodes 12 is connected to the other outer electrode 14. The outer electrode 14 is primarily arranged so as to cover a corresponding one of the end surfaces 15 of the ceramic laminate body 13, but also covers portions of the upper surface 8, the lower surface 9, and both side surfaces 16 that are continuous with the end surface 15. Another outer electrode 14 is similarly arranged to cover the other end surface 15.

Herein, for convenience purposes, the monolithic ceramic capacitor 10 is referred to as a monolithic capacitor 10, the dielectric ceramic layer 11 is referred to as a dielectric layer 11, and the ceramic laminate body 13 is referred to as a laminate body 13. In a description of the orientation of the monolithic capacitor 10, the direction in which the dielectric layers 11 are stacked is referred to as a vertical direction, the direction in which the pair of outer electrodes 14 are arranged is referred to as a lengthwise direction, and the direction orthogonal to the vertical direction and the lengthwise direction is referred to as a widthwise direction.

The laminate body 13 preferably has a cuboid or substantially cuboid shape with the corners rounded off, for example. The outer electrodes 14 provided on both end surfaces 15 of the laminate body 13 also preferably have a rounded shape so as to correspond to the shape of the corners of the laminate body 13. However, in the first preferred embodiment of the present invention, each end surface 15 of the laminate body 13 is understood to include the above-described rounded portions in addition to a flat portion. Thus, the end surfaces 15 are illustrated as being entirely flat in FIG. 1 and the rounded portions are not illustrated.

In the first preferred embodiment, as illustrated in FIG. 1, the outer electrodes 14 arranged over both end surfaces 15 of the monolithic capacitor 10 each include a solder-repellent portion 17 and a solder-receivable portion 18. The solder-repellent portion 17 is a portion that does not allow molten solder to adhere thereto when the molten solder is brought into contact with the solder-repellent portion 17 from the outside of the monolithic capacitor 10. The solder-receivable portion 18 is a portion that allows the molten solder to adhere thereto. The solder-repellent portion 17 is arranged so as to cover a central portion C of each end surface 15 of the laminate body 13 when the monolithic capacitor 10 is viewed from the end surface 15. The solder-receivable portion 18 includes portions disposed on two opposing sides of the solder-repellent portion 17 in the vertical or widthwise direction so as to sandwich the solder-repellent portion 17.

Specifically, when the monolithic capacitor 10 is viewed from the end surface 15, preferably, each outer electrode 14 is substantially rectangular and the solder-repellent portion 17 is circular or substantially circular. The solder-repellent portion 17 is defined by a substantially circular solder-resistant film 19 attached to the surface of the outer electrode 14. In other words, a portion covered by the solder-resistant film 19 in FIG. 1 is the solder-repellent portion 17. On the other hand, the solder-receivable portion 18 is a portion of the outer electrode 14 that is not covered by the solder-resistant film 19. The solder-receivable portion 18 is arranged so as to extend over at least four corner portions of the outer electrode 14. The solder-receivable portion 18 configured such that upper and lower portions of the solder-receivable portion 18 are symmetrical with respect to a horizontal line passing the central portion C.

Preferably, the solder-resistant film 19 is made of a material that is not deformed at the soldering temperature (for example, approximately 139° C. or higher), such as a heat-resistant resin, for example. Each outer electrode 14 preferably includes, for example, three layers of copper (Cu), nickel (Ni), and tin (Sn) or copper (Cu), nickel (Ni), and gold (Au). The materials of the outer electrodes 14 allow the molten solder to adhere thereto when the molten solder is brought into contact therewith. Examples of the material of the molten solder preferably include a tin-silver-copper (Sn—Ag—Cu) alloy.

The dielectric layers 11 are preferably made of a ferroelectric material such as barium titanate, for example. Therefore, when an AC voltage is applied to the pair of outer electrodes 14 of the monolithic capacitor 10, the polarities of the dielectric layers 11 are reversed and thus the electrostrictive phenomenon occurs.

Figure 2:
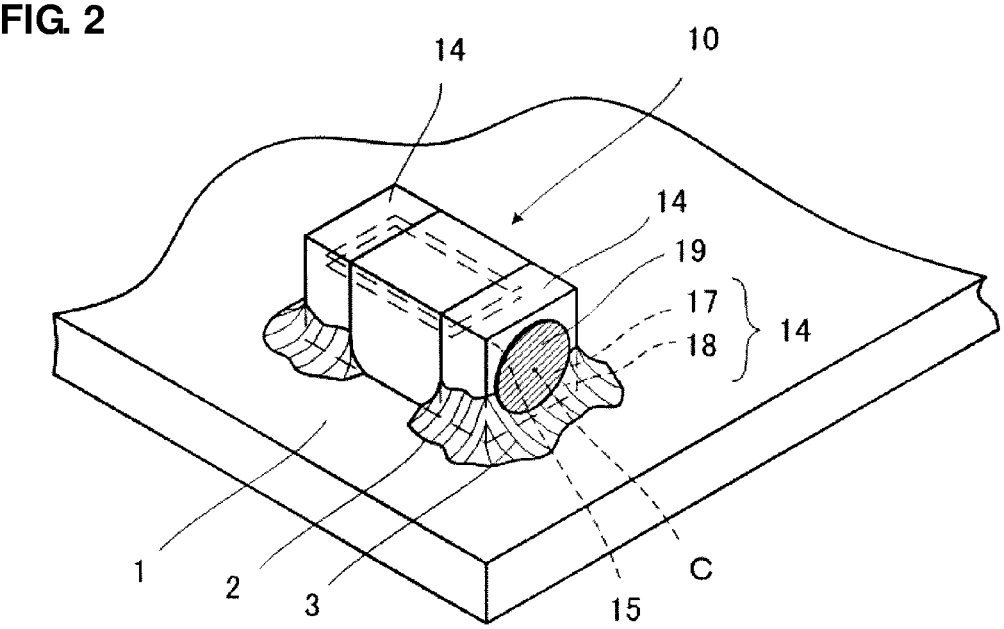
FIG. 2 illustrates a state in which the monolithic ceramic capacitor illustrated in FIG. 1 is mounted on a circuit board.

FIG. 2 illustrates a state in which the monolithic capacitor 10 according to the first preferred embodiment is mounted on a circuit board 1 via a solder 2. As illustrated in FIG. 2, molten solder adheres to the solder-receivable portions 18 of the monolithic capacitor 10 and fillets 3 are provided so as to connect the solder-receivable portions 18 to the circuit board 1. However, the molten solder does not adhere to the solder-repellent portions 17, that is, portions around the central portion C of the end surfaces 15 and thus the fillets 3 are not formed over these portions.

Figure 16:
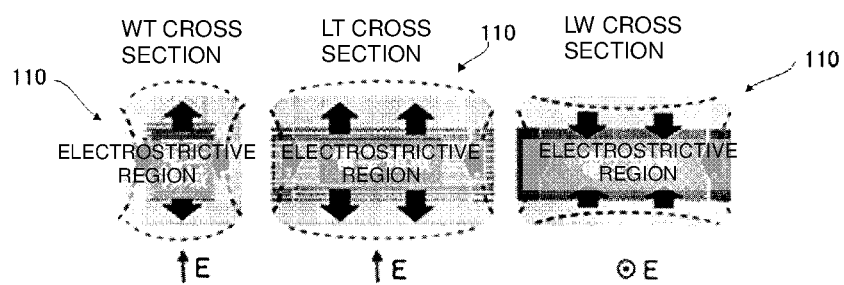
FIG. 16 illustrates a state in which an AC voltage is applied to a known monolithic ceramic capacitor.
Figure 17:
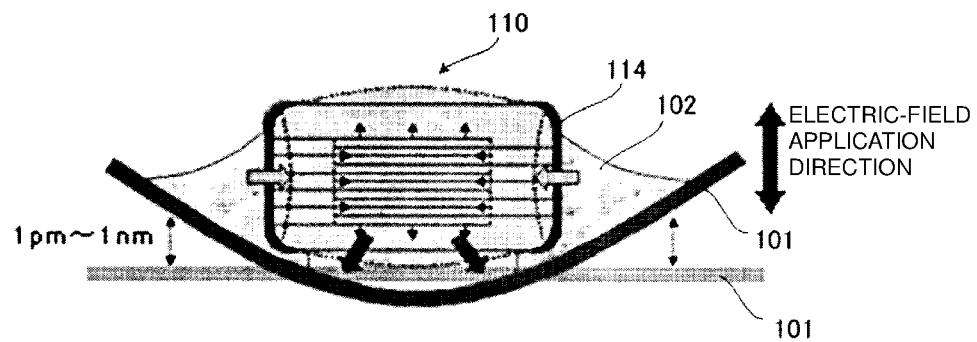
FIG. 17 illustrates a state where an AC voltage is applied to the known monolithic ceramic capacitor mounted on a circuit board.

As illustrated in FIG. 16, when an AC voltage is applied to the monolithic capacitor 10, portions around the central portion C of the end surfaces 15 expand and contract to a large extent. According to the first preferred embodiment, as illustrated in FIG. 2, the molten solder does not adhere to portions around the central portion C of the end surfaces. Thus, expansion and contraction that occurs as a result of application of an AC voltage is not substantially transmitted to the circuit board 1. Consequently, vibrations of the circuit board 1 are reduced and acoustic noise is much less likely to be generated.

Further, as illustrated in FIG. 2, the molten solder adheres to the solder-receivable portions 18. Thus, the fillets 3 are provided so as to connect the solder-receivable portions 18 to the circuit board 1, thus securely connecting the monolithic capacitor 10 and the circuit board 1 together. When an AC voltage is applied to the monolithic capacitor 10, portions around the central portion C of the end surfaces 15 expand and contract to a large extent, as illustrated in FIG. 16, but portions other than the portions around the central portion C expand and contract to a smaller extent. Consequently, even when a fillet 3 is provided in portions other than the portions around the central portion C of the end surfaces 15, expansion and contraction transmitted to the circuit board 1 is relatively small and, thus, the effect of vibrations transmitted to the circuit board 1 is insignificant.

Further, when the monolithic capacitor 10 is viewed from one of the end surfaces 15 as illustrated in FIG. 2, the corresponding solder-receivable portion 18 includes portions disposed on two opposing sides of the solder-repellent portion 17. Therefore, the monolithic capacitor 10 can be mounted on the circuit board 1 regardless of whether its upper surface faces upward or downward.

Preferably, each solder-receivable portion 18 is arranged so as to extend over four corner portions of the corresponding outer electrode 14. As illustrated in FIG. 16, when the monolithic capacitor 10 is viewed from one of the end surface 15, the four corner portions of the outer electrode 14 expand and contract to a smaller extent than portions other than the four corner portions. Thus, when the fillet 3 is provided over any one of the four corner portions of the outer electrode 14 and not provided over portions other than the four corner portions, vibrations transmitted to the circuit board 1 are effectively reduced.

In addition, preferably, each solder-receivable portion 18 is configured such that upper and lower portions are symmetrical with each other. When the monolithic capacitor 10 is configured in this manner, each fillet 3 will have substantially the same shape regardless of whether the upper surface of the monolithic capacitor 10 faces upward or downward when the monolithic capacitor 10 is mounted on the circuit board 1. Consequently, the amplitudes of vibrations transmitted to the circuit board 1 are substantially the same in both cases, thereby stably reducing vibrations regardless of whether the upper surface of the capacitor 10 faces upward or downward.

In addition, as described above, the material of the solder-resistant film 19 is preferably, for example, a heat-resistant resin that is not deformed at the soldering temperature. Thus, a portion to which the solder is not to be adhered is maintained free from the solder at the soldering temperature when the monolithic capacitor 10 is mounted on the circuit board 1.

Here, a non-limiting example of a method of manufacturing the monolithic capacitor 10 according to the first preferred embodiment will now be described. First, an internal electrode 12 made of a material such as a silver-palladium (Ag—Pd) alloy, for example, is preferably printed on the surface of a ceramic green sheet made of a barium-titanate-based material, for example. The printing operation is repeated until a predetermined number of ceramic green sheets each including the internal electrode 12 are stacked on top of one another. Then, the stacked sheets are fired at a predetermined temperature to form a laminate body 13. Further, conductive paste is applied to both end portions of the laminate body 13 and the laminate body 13 is fired to form outer electrodes 14. The process described thus far is substantially the same as that in a known monolithic-capacitor manufacturing method.

In order to obtain the monolithic capacitor 10 according to the first preferred embodiment, solder-receivable portions 17 are also formed on portions of the outer electrode 14 provided on both end surfaces 15 (these portions will also be referred to as end surface portions of the outer electrode 14). To this end, solder-resistant films 19 are attached to the both end surface portions. The solder-resistant films 19 are, for example, print-transferred thereto. Specifically, a printing plate having a concave portion with a predetermined shape is filled with a paste material of the solder-resistant films 19. Then, the end surface portion of one of the outer electrodes 14 is brought into contact with the printing plate. Thereafter, the outer electrode 14 is separated from the printing plate and the paste material that has adhered to the outer electrode 14 is cured. The solder-resistance film 19 is similarly attached to the end surface portion of the other outer electrode 14. Examples of other printing methods include roller transfer and pin transfer.

The monolithic capacitor 10 according to the first preferred embodiment can be appropriately modified with regard to the position and/or the shape of the solder-repellent portions 17. FIGS. 3 to 7 illustrate monolithic capacitors according to some non-limiting exemplary modifications.

Figure 3:
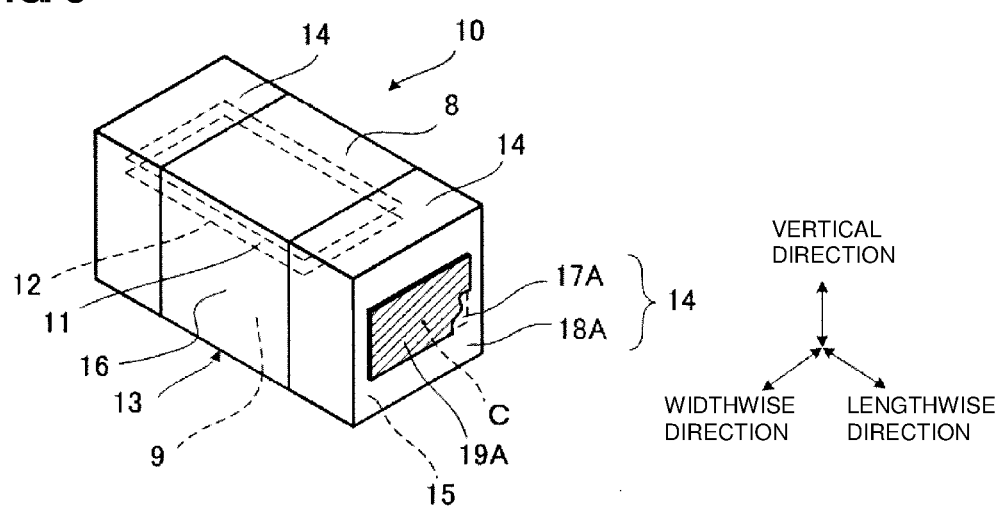
FIG. 3 illustrates a monolithic ceramic capacitor according to a first modification of a preferred embodiment of the present invention in which the solder-repellent portion illustrated in FIG. 1 is modified.

FIG. 3 illustrates a monolithic capacitor 10 according to a first modification of a preferred embodiment of the present invention in which the solder-repellent portions 17 are modified. In FIG. 3, when the monolithic capacitor 10 is viewed from one of the end surfaces 15, a solder-repellent portion 17A is arranged so as to cover the central portion C of the end surface 15. The solder-repellent portion 17A is defined by a rectangular or substantially rectangular solder-resistant film 19A attached to the surface of the outer electrode 14. A solder-receivable portion 18A includes portions disposed on two opposing sides of the solder-repellent portion 17A in the vertical or widthwise direction so as to sandwich the solder-repellent portion 17A.

Figure 4:
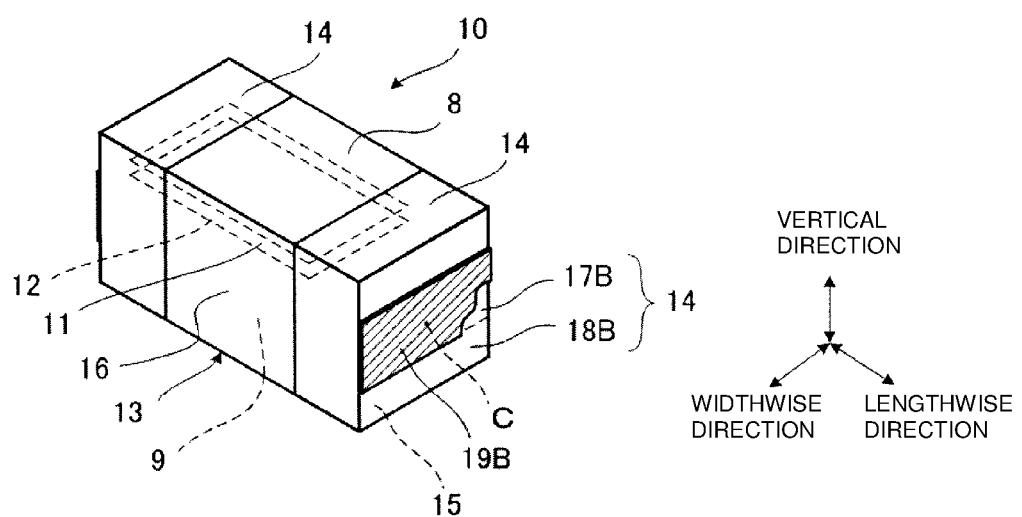
FIG. 4 illustrates a monolithic ceramic capacitor according to a second modification of a preferred embodiment of the present invention in which the solder-repellent portion illustrated in FIG. 1 is modified.

FIG. 4 illustrates a monolithic capacitor 10 according to a second modification of a preferred embodiment of the present invention in which the solder-repellent portions 17 are modified. In FIG. 4, when the monolithic capacitor 10 is viewed from one of the end surfaces 15, a solder-repellent portion 17B is arranged so as to cover the central portion C of the end surface 15. The solder-repellent portion 17B is defined by a solder-resistant film 19B having a widthwise-extending strip shape attached to the surface of the outer electrode 14. Solder-receivable portions 18B are located on two opposing sides of the solder-repellent portion 17B in the vertical direction so as to sandwich the solder-repellent portion 17B.

Figure 5:
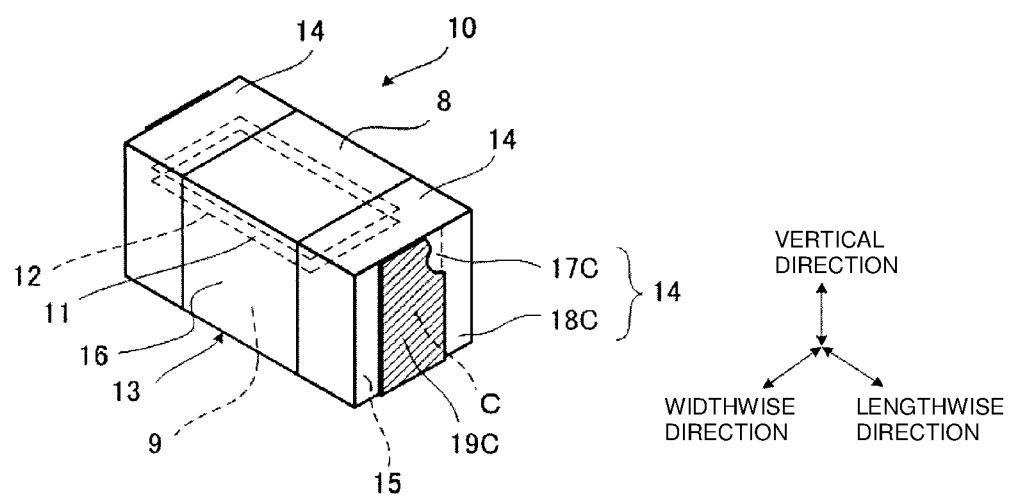
FIG. 5 illustrates a monolithic ceramic capacitor according to a third modification of a preferred embodiment of the present invention in which the solder-repellent portion illustrated in FIG. 1 is modified.

FIG. 5 illustrates a monolithic capacitor 10 according to a third modification of a preferred embodiment of the present invention in which the solder-repellent portions 17 are modified. In FIG. 5, when the monolithic capacitor 10 is viewed from one of the end surfaces 15, a solder-repellent portion 17C is arranged so as to cover the central portion C of the end surface 15. The solder-repellent portion 17C is defined by a solder-resistant film 19C having a vertically-extending strip shape attached to the surface of the outer electrode 14. Solder-receivable portions 18C are located on two opposing sides of the solder-repellent portion 17C in the widthwise direction so as to sandwich the solder-repellent portion 17C.

Figure 6:
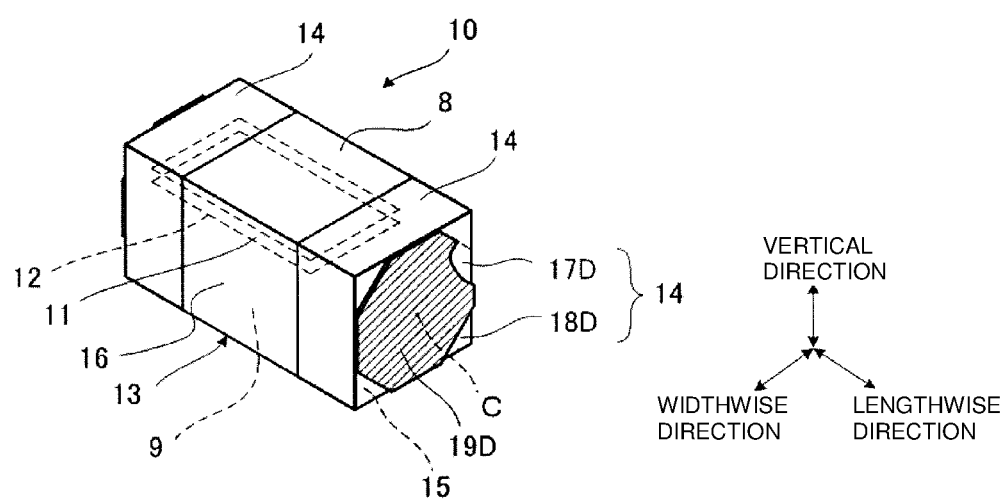
FIG. 6 illustrates a monolithic ceramic capacitor according to a fourth modification of a preferred embodiment of the present invention in which the solder-repellent portion illustrated in FIG. 1 is modified.

FIG. 6 illustrates a monolithic capacitor 10 according to a fourth modification of a preferred embodiment of the present invention in which the solder-repellent portions 17 are modified. In FIG. 6, when the monolithic capacitor 10 is viewed from one of the end surfaces 15, a solder-repellent portion 17D is arranged so as to cover the central portion C of the end surface 15. The solder-repellent portion 17D is defined by an octagonal or substantially octagonal solder-resistant film 19D attached to the surface of the outer electrode 14. Solder-receivable portions 18D are arranged in four corner portions of the end surface portion of the outer electrode 14 around the solder-repellent portion 17D.

Figure 7:
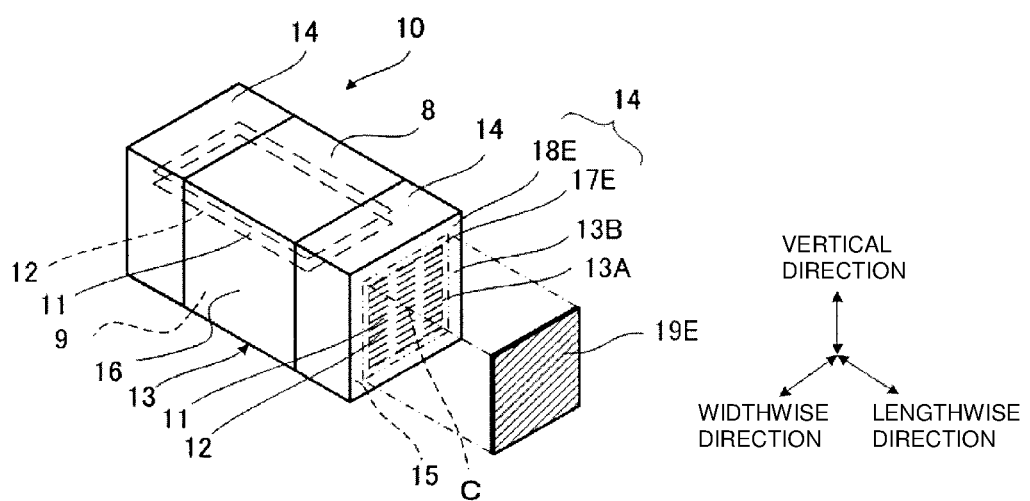
FIG. 7 illustrates a monolithic ceramic capacitor according to a fifth modification of a preferred embodiment of the present invention in which the solder-repellent portion illustrated in FIG. 1 is modified.

FIG. 7 illustrates a monolithic capacitor 10 according to a fifth modification of a preferred embodiment of the present invention in which the solder-repellent portions 17 are modified. As illustrated in FIG. 7, the laminate body 13 includes a main laminate portion 13A and a margin portion 13B. The main laminate portion 13A includes dielectric layers 11 and internal electrodes 12 that are alternately stacked on top of one another and bringing the dielectric layers 11 and the internal electrodes 12 into contact with one another. The margin portion 13B is disposed around the main laminate portion 13A by stacking the dielectric layers 11 on top of one another. The main laminate portion 13A is a portion in which an electrostrictive phenomenon occurs when a voltage is applied to the monolithic capacitor 10.

A solder-repellent portion 17E is defined by a quadrangular or substantially quadrangular solder-resistant film 19E attached to the surface of the outer electrode 14. When the monolithic capacitor 10 is viewed from either one of the end surfaces 15, the area of the solder-repellent portion 17E is preferably larger than the area of the main laminate portion 13A but smaller than the area defined by the outer periphery of the margin portion 13B. The area of a solder-receivable portion 18E is an area of the margin portion 13B excluding the area covered by the solder-repellent portion 17E. According to the fifth modification, after the main laminate portion 13A is covered by the solder-repellent portions 17E, the monolithic capacitor 10 is mounted on the circuit board 1. Thus, fillets 3 are prevented from being provided over the main laminate portion 13A so as to effectively reduce vibrations.

Throughout the first to fifth modifications, preferably, the solder-receivable portion 18A or 18B, or the solder-receivable portions 18C, 18D, or 18E is/are arranged so as to extend over four corner portions of the end surface portion of the outer electrode 14 as in the case of the first preferred embodiment illustrated in FIG. 1. In addition, preferably, each solder-receivable portion 18A or 18B is arranged such that upper and lower portions of the solder-receivable portion 18A or 18B are symmetrical with respect to the horizontal line passing through the central portion C of the corresponding end surface 15, or, preferably, each pair or set of the solder-receivable portions 18C, 18D, or 18E is arranged such that upper ones and lower ones of the solder-receivable portions 18C, 18D, or 18E are symmetrical with respect to the horizontal line passing through the central portion C of the corresponding end surface 15.

The above-described preferred embodiment and non-limiting exemplary modifications do not limit the present invention defined in the claims and can be modified in various manners within a scope of the present invention. Although a typical monolithic capacitor 10 is described as an example in the first preferred embodiment, preferred embodiments of the present invention are also applicable not only to a monolithic capacitor 10 including two outer electrodes 14 but also to a three-terminal monolithic capacitor having three outer electrodes 14, for example. In addition, preferred embodiments of the present invention are applicable not only to the monolithic capacitor 10 but also to general monolithic ceramic electronic components including a monolithic LC filter, for example.

Second Preferred Embodiment

In a monolithic capacitor 20 according to a second preferred embodiment of the present invention, each outer electrode is arranged so as to cover a portion but not all of the corresponding end surface 15. The components that are the same as those in the first preferred embodiment are not described in detail.

Figure 8:
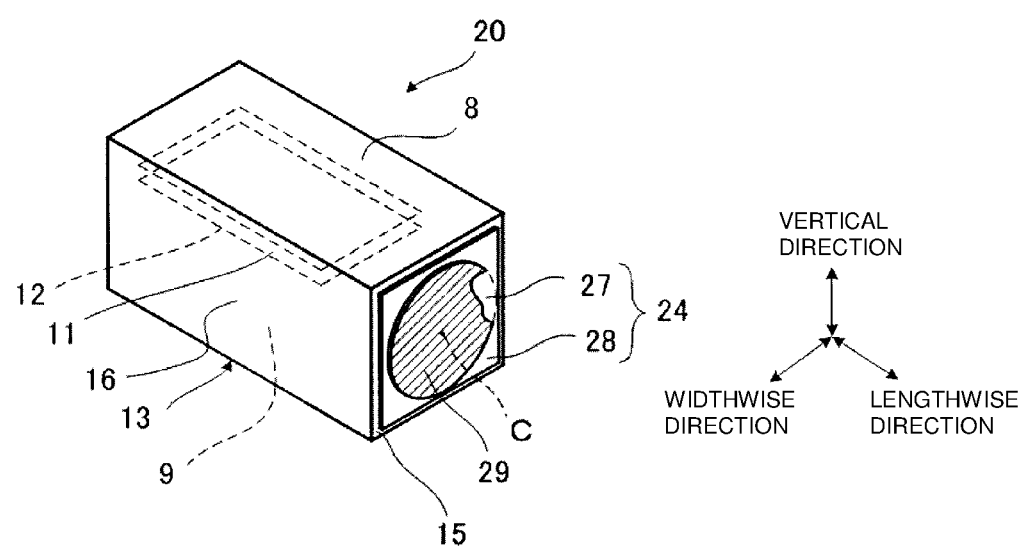
FIG. 8 illustrates a monolithic ceramic capacitor according to a second preferred embodiment of the present invention.

As illustrated in FIG. 8, when the monolithic capacitor 20 is viewed from one of the end surfaces 15, the outer electrode 24 has a square or substantially square shape so as to cover a portion of the end surface 15 of the laminate body 13. The outer electrode 24 is preferably formed by a plating or printing transfer process, for example.

A solder-repellent portion 27 is arranged so as to cover the central portion C of the end surface 15 of the laminate body 13. The solder-repellent portion 27 has a circular or substantially circular shape that is smaller than the area of the outer electrode 24. The solder-repellent portion 27 is defined by a circular or substantially circular solder-resistant film 29 attached to the surface of the outer electrode 24. A solder-receivable portion 28 includes portions disposed on two opposing sides of the solder-repellent portion 27 in the vertical or widthwise direction so as to sandwich the solder-repellent portion 27.

In the second preferred embodiment, as in the case of the first preferred embodiment, the solder-receivable portion 28 is preferably arranged so as to extend over at least four corner portions of the outer electrode 24. Also preferably, the solder-receivable portion 28 is configured such that the two opposing sides of the solder-receivable portion 28 in the vertical direction are symmetrical with each other.

According to the second preferred embodiment, molten solder does not adhere to portions around the central portion C of the end surfaces 15 of the laminate body 13. Thus, expansion and contraction that occurs as a result of application of an AC voltage is not significantly transmitted to the circuit board 1. Consequently, vibrations of the circuit board 1 are reduced and acoustic noise is less likely to be generated. Further, the molten solder adheres to the solder-receivable portions 28. Thus, fillets 3 are provided so as to connect the solder-receivable portions 28 to the circuit board 1, thus securely connecting the monolithic capacitor 20 and the circuit board 1 together.

Figure 9:
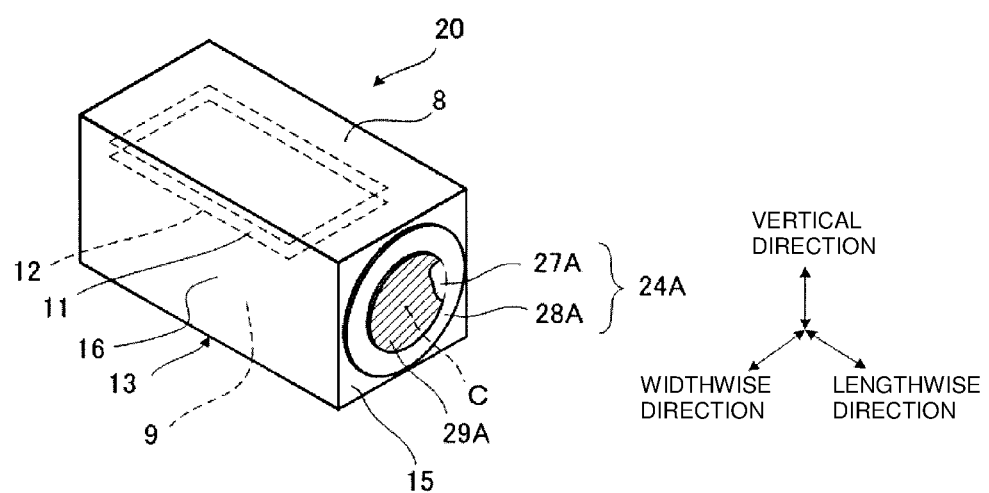
FIG. 9 illustrates a monolithic ceramic capacitor according to a sixth modification of a preferred embodiment of the present invention in which the outer electrode illustrated in FIG. 8 is modified.
Figure 10:
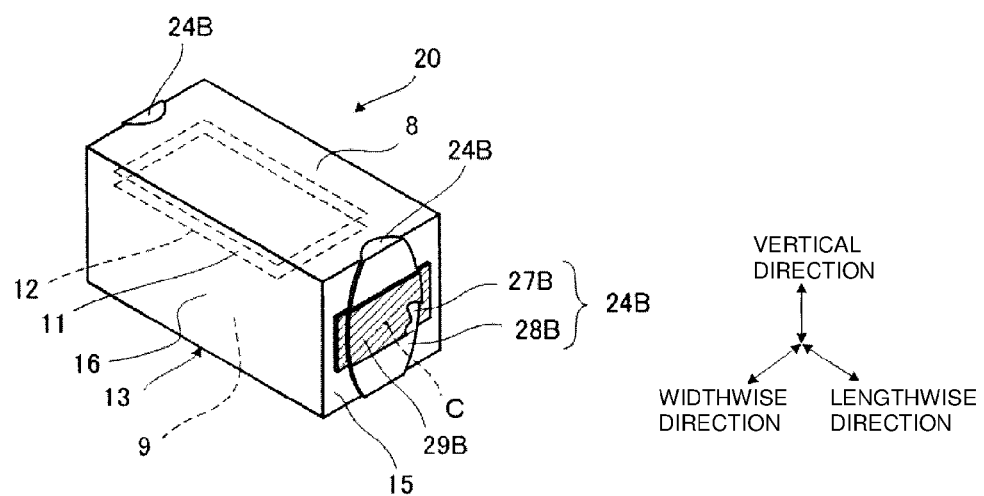
FIG. 10 illustrates a monolithic ceramic capacitor according to a seventh modification of a preferred embodiment of the present invention in which the outer electrode illustrated in FIG. 8 is modified.

The monolithic capacitor 20 according to the second preferred embodiment can be appropriately modified with regard to the shape of the outer electrodes 24 and/or the shape of the solder-repellent portions 27. FIGS. 9 and 10 illustrate monolithic capacitors according to some of exemplary modifications of a preferred embodiment of the present invention.

FIG. 9 illustrates a monolithic capacitor 20 according to a sixth modification of a preferred embodiment of the present invention in which the outer electrodes 24 are modified. In FIG. 9, when the monolithic capacitor 20 is viewed from one of the end surfaces 15, an outer electrode 24A is circular or substantially circular. The solder-repellent portion 27A is arranged so as to cover the central portion C of the end surface 15. The solder-repellent portion 27A has a circular or substantially circular shape that is smaller than the outer electrode 24A. The solder-repellent portion 27A is defined by a circular or substantially circular solder-resistant film 29A attached to the surface of the outer electrode 24A. A solder-receivable portion 28A includes portions disposed on two opposing sides of the solder-repellent portion 27A in the vertical or widthwise direction so as to sandwich the solder-repellent portion 27A. Preferably, the solder-receivable portion 28A is configured such that upper and lower portions are symmetrical with each other.

FIG. 10 illustrates a monolithic capacitor 20 according to a seventh modification of a preferred embodiment of the present invention in which the outer electrodes 24 are modified. In FIG. 10, when the monolithic capacitor 20 is viewed from one of the end surfaces 15, the outer electrode 24B has a strip shape extending in the vertical direction and including a middle portion that protrudes in the widthwise direction. Each outer electrode 24B covers a portion of an upper surface 8 and a lower surface 9 of the monolithic capacitor 20. A solder-repellent portion 27B is arranged so as to cover the central portion C of the end surface 15 of the laminate body 13. The solder-repellent portion 27B is rectangular or substantially rectangular. The solder-repellent portion 27B is provided on the surface of the outer electrode 24B and the end surface 15 by attaching a substantially rectangular solder-resistant film 29B to the surface of the outer electrode 24B and the end surface 15. Solder-receivable portions 28B are located on two opposing sides of the solder-repellent portion 27B in the vertical direction so as to sandwich the solder-repellent portion 27B.

Preferably, but not necessarily, the solder-receivable portions 28B are arranged such that the upper one and the lower one of the solder-receivable portions 28B are symmetrical with each other. Even when the outer electrode 24B is configured such that the upper and lower portions are not symmetrical, such as a trapezoidal shape, for example, as long as the solder-repellent portion 27B is arranged so as to cover the central portion C of the end surface 15, a fillet 3 can be prevented from being provided over a portion of the monolithic capacitor 20 that expands and contracts to a large extent when an AC voltage is applied to the monolithic capacitor 20.

In the seventh modification, each solder-resistant film 29B is provided on the dielectric ceramic layers 11 on the corresponding end surface 15 of the laminate body 13. With this configuration, the solder-resistant film 29B is securely adhered to the end surface 15 of the laminate body 13 and thus the solder-repellent portion 27B is less likely to be displaced or detached under high temperature conditions such as in soldering.

Third Preferred Embodiment

In a monolithic capacitor 30 according to a third preferred embodiment of the present invention, solder-repellent portions are also provided over portions of the outer electrode 14 on side surfaces 16 (these portions will be referred to as side surface portions, below). Components that are the same as those in the first preferred embodiment are not described in detail.

Figure 11:
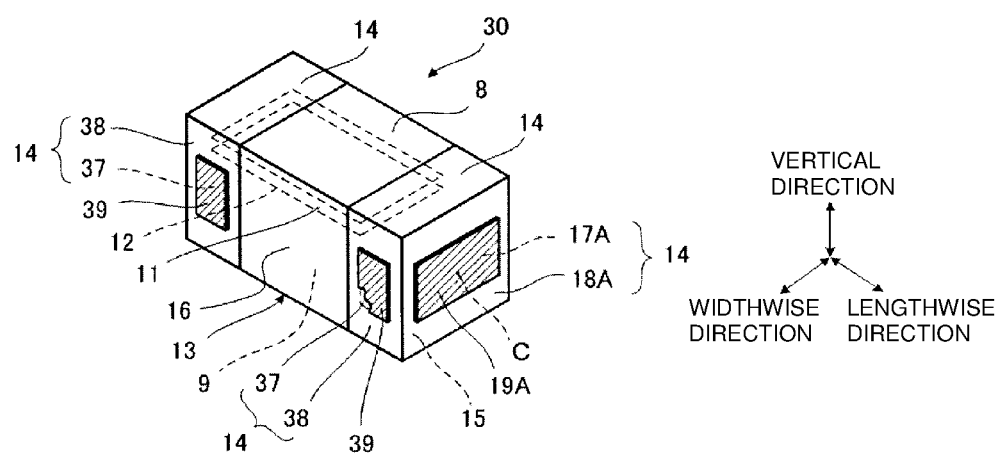
FIG. 11 illustrates a monolithic ceramic capacitor according to a third preferred embodiment of the present invention.

As illustrated in FIG. 11, when the monolithic capacitor 30 is viewed from the side surface 16, a solder-repellent portion 37 is arranged so as to extend over a portion of the side surface portion of each outer electrode 14. The solder-repellent portion 37 is defined by a rectangular or substantially rectangular solder-resistant film 39 attached to the surface of the side surface portion of the outer electrode 14. A solder-receivable portion 38 includes portions disposed on two opposing sides of the solder-repellent portion 37 in the vertical direction so as to sandwich the solder-repellent portion 37. Here, when the monolithic capacitor 30 is viewed from either one of the end surfaces 15, the monolithic capacitor 30 looks substantially the same as that in the case of the first modification (FIG. 3).

Figure 12:
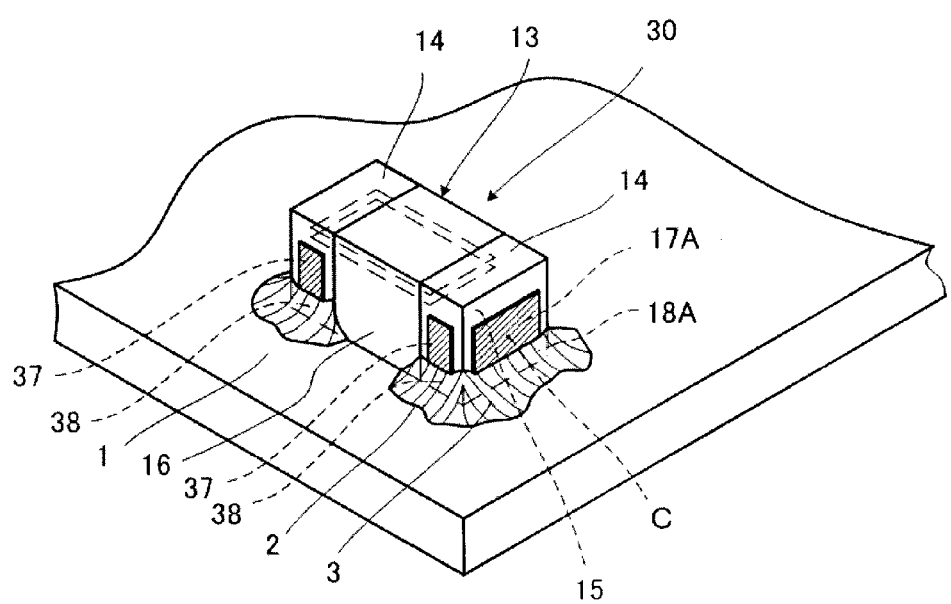
FIG. 12 illustrates a monolithic ceramic capacitor according to an eighth modification of a preferred embodiment of the present invention in which the solder-repellent portion illustrated in FIG. 11 is modified.

FIG. 12 illustrates a state in which the monolithic capacitor 30 according to the third preferred embodiment is mounted on the circuit board 1 via solder 2. As illustrated in FIG. 12, molten solder adheres to the solder-receivable portions 38 of the monolithic capacitor 30, so that fillets 3 are provided so as to connect the solder-receivable portions 38 to the circuit board 1. However, the molten solder does not adhere to the solder-repellent portions 37, that is, the portions around the central portion C of the end surfaces 15 and the side surface portions, so that fillets 3 are not provided over these portions.

When an AC voltage is applied to the monolithic capacitor 30, not only the end surfaces 15 but also side surfaces expand and contract, as illustrated in FIG. 16. Since molten solder does not adhere to the side surface portions according to the third preferred embodiment, as illustrated in FIG. 12, expansion and contraction that occurs as a result of application of an AC voltage is not significantly transmitted to the circuit board 1. Consequently, vibrations of the circuit board 1 are reduced and acoustic noise is less likely to be generated.

Figure 13:
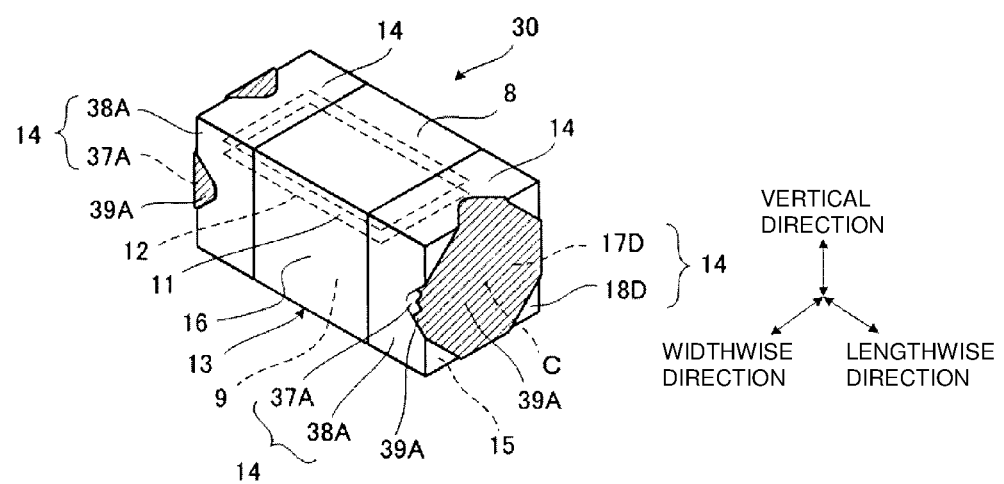
FIG. 13 illustrates a monolithic ceramic capacitor according to a ninth modification of a preferred embodiment of the present invention in which the solder-repellent portion illustrated in FIG. 11 is modified.
Figure 14:
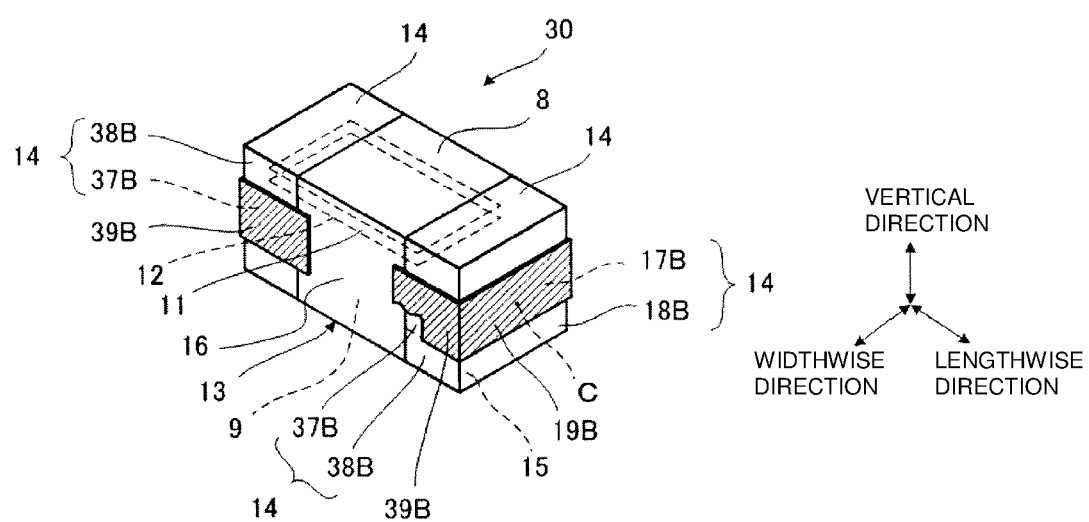
FIG. 14 illustrates a circuit board on which the monolithic ceramic capacitor illustrated in FIG. 11 is mounted.

The monolithic capacitor 30 according to the third preferred embodiment can be appropriately modified with regard to the position and/or the shape of the solder-repellent portions 37. FIGS. 13 and 14 illustrate monolithic capacitors 30 according to some non-limiting exemplary modifications.

FIG. 13 illustrates a monolithic capacitor 30 according to an eighth modification of a preferred embodiment of the present invention in which the solder-repellent portions 37 are modified. In the monolithic capacitor 30 according to the eighth modification, solder-repellent portions 37A are arranged so as to extend over a portion of the upper surface portion, the lower surface portion, and two side surface portions of the outer electrode 14. On each of the side surfaces 16, the corresponding solder-receivable portion 38A includes portions disposed on two opposing sides of the solder-repellent portion 37A in the vertical direction so as to sandwich the solder-repellent portion 37A. On each of the upper surface 8 and the lower surface 9, the corresponding solder-receivable portion 38A includes portions disposed on two opposing sides of the solder-repellent portion 37A in the widthwise direction so as to sandwich the solder-repellent portion 17A. When the monolithic capacitor 30 illustrated in FIG. 13 is viewed from either one of the end surfaces 15, the monolithic capacitor 30 looks substantially the same as that in the case of the fourth modification (FIG. 6).

A solder-repellent portion 17D arranged on the end surface 15 and the solder-repellent portions 37A arranged on the upper surface 8, the lower surface 9, and the side surfaces 16 are defined together by a solder-resistant film 39A attached to these surfaces. The solder-resistant film 39A is preferably attached by print-transferring a paste material having a rhombic or substantially rhombic shape to the surfaces of the outer electrode 14 from the end surface 15 using a rubber product, for example. According to this manufacturing method, the solder-repellent portions 17D and 37A can be formed concurrently and efficiently.

FIG. 14 illustrates a monolithic capacitor 30 according to a ninth modification of a preferred embodiment of the present invention in which the solder-repellent portions 37 are modified. In the monolithic capacitor 30 according to the ninth modification, when the monolithic capacitor 30 is viewed from one of the side surfaces 16, the solder-repellent portion 37B is arranged so as to extend over a portion of the side surface portion of the outer electrode 14. The solder-repellent portion 37B is defined by a strip-shaped solder-resistant film 39B attached to the surface of the side surface portion of the outer electrode 14. Solder-receivable portions 38B are arranged on two opposing sides of the solder-repellent portion 37B in the vertical direction so as to sandwich the solder-repellent portion 37B. When the monolithic capacitor 30 illustrated in FIG. 14 is viewed from either one of the end surfaces 15, the monolithic capacitor 30 looks substantially the same as that according to the second modification (FIG. 4).

The solder-resistant film 39B is provided on a portion of some of the dielectric ceramic layers 11 on the side surfaces 16 of the laminate body 13. Consequently, the solder-resistant film 39B is securely adhered to the side surface 16 of the laminate body 13 and the solder-repellent portion 37B is less likely to be displaced or detached under high temperature conditions such as in soldering.

Fourth Preferred Embodiment

In a monolithic capacitor 40 according to a fourth preferred embodiment of the present invention, the outer electrodes 14 are themselves not subjected to a molten-solder repelling process. Components that are the same as those in the first preferred embodiment are not described in detail.

Figure 15:
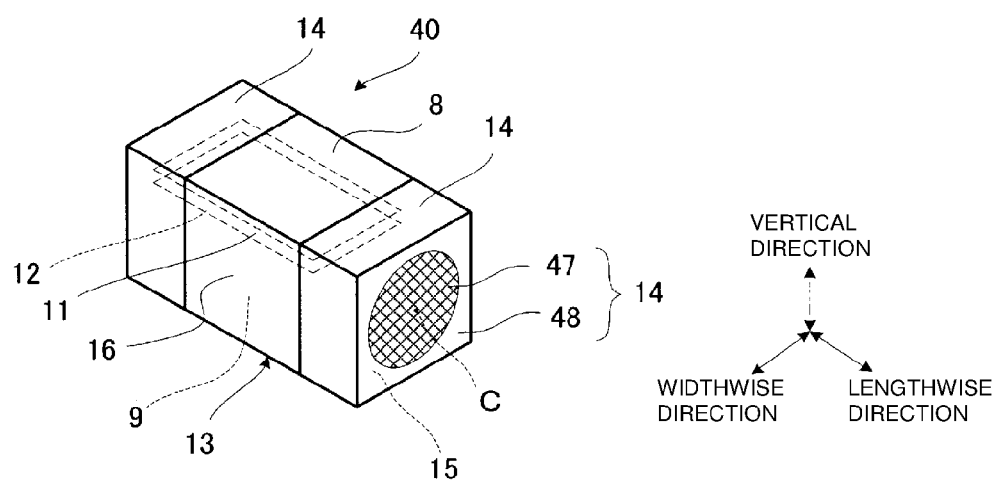
FIG. 15 illustrates a monolithic ceramic capacitor according to a fourth preferred embodiment of the present invention.

As illustrated in FIG. 15, each solder-repellent portion 47 is provided in a portion of the corresponding outer electrode 14 of the monolithic capacitor 40. The solder-repellent portion 47 is provided by oxidizing a desired portion of the outer electrode 14. This oxidization prevents molten solder from adhering to the solder-repellent portion 47.

When the monolithic capacitor 40 is viewed from either one of the end surfaces 15, the solder-repellent portion 47 is arranged so as to cover the central portion C of the end surface 15 of the laminate body 13. A solder-receivable portion 48 includes portions disposed on two opposing sides of the solder-repellent portion 47 in the vertical or widthwise direction so as to sandwich the solder-repellent portion 47.

Specifically, when the monolithic capacitor 40 is viewed from either one of the end surfaces 15, preferably, the outer electrode 14 has a quadrangular or substantially quadrangular shape and the solder-repellent portion 47 has a circular or substantially circular shape. Four corner portions of the outer electrode 14 are not oxidized and thus allow molten solder to adhere thereto. The solder-receivable portion 48 is configured such that upper and lower portions are symmetrical with respect to the horizontal line passing the central portion C.

In the monolithic capacitor 40 according to the fourth preferred embodiment, molten solder does not adhere to portions around the central portion C of the end surfaces 15. Thus, expansion and contraction that occur as a result of application of an AC voltage are not significantly transmitted to the circuit board 1. Consequently, vibrations of the circuit board 1 are reduced and acoustic noise is less likely to be generated. Further, since the molten solder adheres to the solder-receivable portions 48, fillets 3 are provided so as to connect the solder-receivable portions 48 to the circuit board 1, thus securely connecting the monolithic capacitor 40 and the circuit board 1 together.

The solder-repellent portion 47 is formed by fixing the monolithic capacitor 40 to a jig and then irradiating a portion of the end surface portion of the outer electrode 14 with a laser beam. By being irradiated with a laser beam, the surface of the outer electrode 14 is oxidized. The monolithic capacitor 40 made by the method involving the oxidization process can achieve the same or substantially the same effects as those achieved by the monolithic capacitor 10 according to the first preferred embodiment without including an additional component such as the solder-resistant film 19, 29, or 39.

As in the case of the monolithic capacitors 10 to 30 according to the first to third preferred embodiments, the monolithic capacitor 40 according to the fourth preferred embodiment can be appropriately modified with regard to the position or the shape of the solder-repellent portion 47 and the solder-receivable portion 48.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A monolithic ceramic electronic component comprising:
   a ceramic laminate body having a cuboid or substantially cuboid shape and including dielectric ceramic layers made of a ferroelectric material and internal electrodes alternately stacked on top of one another in a vertical direction, the ceramic laminate body including an outer periphery defined by an upper surface, a lower surface, two side surfaces, and two end surfaces that are perpendicular or substantially perpendicular to the upper surface, the lower surface, and the two side surfaces; and
   an outer electrode arranged over one of the two end surfaces and portions of the upper surface, the lower surface, and the two side surfaces that are continuous with the one of the two end surfaces so as to be electrically connected to the internal electrodes; wherein
   the outer electrode includes a solder-repellent portion to which molten solder does not adhere and a solder-receivable portion to which the molten solder does adhere;
   the solder-repellent portion is defined by a strip shaped solder-resistant film attached to portions of the outer electrode arranged over the one of the two end surfaces and the two side surfaces of the outer electrode; and
   the solder-receivable portion includes portions disposed on two opposing sides of the solder-repellent portion in the vertical direction so as to sandwich the solder-repellent portion.

2. The monolithic ceramic electronic component according to claim 1, wherein
   the solder-repellent portion is provided on a portion of some of the dielectric ceramic layers on at least one of the two side surfaces of the ceramic laminate body.

3. The monolithic ceramic electronic component according to claim 1, wherein
   when the monolithic ceramic electronic component is viewed from the one of the two end surfaces over which the outer electrode is arranged, the outer electrode has a quadrangular or substantially quadrangular shape; and
   the solder-receivable portion is arranged so as to extend over four corner portions of the outer electrode.

4. The monolithic ceramic electronic component according to claim 1, wherein when the monolithic ceramic electronic component is viewed from the one of the two end surfaces over which the outer electrode is arranged, the solder-receivable portion is configured such that upper and lower portions of the solder-receivable portion in the vertical direction are symmetrical with each other.

5. The monolithic ceramic electronic component according to claim 1, wherein when the monolithic ceramic electronic component is viewed from the one of the two side surfaces over which the outer electrode is arranged, the solder-repellent portion is arranged so as to extend partially over a portion of the outer electrode provided on the side surface.

6. The monolithic ceramic electronic component according to claim 1, wherein the solder-receivable portion is provided in a portion of the outer electrode that is exposed to outside.

7. The monolithic ceramic electronic component according to claim 1, wherein the outer electrode includes three layers of copper, nickel, and tin, or copper nickel, and gold.

8. The monolithic ceramic electronic component according to claim 1, wherein the dielectric ceramic layers are made of barium titanate.

* * * * *